US012328700B2

(12) United States Patent
Dai et al.

(10) Patent No.: US 12,328,700 B2
(45) Date of Patent: Jun. 10, 2025

(54) SYSTEM AND METHOD OF DOWNLINK-UPLINK TIMING RELATIONSHIP

(71) Applicant: ZTE CORPORATION, Guangdong (CN)

(72) Inventors: Jianqiang Dai, Shenzhen (CN); Yachao Yin, Shenzhen (CN); Nan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 482 days.

(21) Appl. No.: 17/843,368

(22) Filed: Jun. 17, 2022

(65) Prior Publication Data

US 2022/0322265 A1 Oct. 6, 2022

Related U.S. Application Data

(63) Continuation of application No. PCT/CN2020/075859, filed on Feb. 19, 2020.

(51) Int. Cl.
*H04W 56/00* (2009.01)
*H04B 7/185* (2006.01)

(52) U.S. Cl.
CPC ..... *H04W 56/0045* (2013.01); *H04B 7/18513* (2013.01)

(58) Field of Classification Search
CPC .............. H04W 56/0045; H04B 7/18513
See application file for complete search history.

(56) References Cited

U.S. PATENT DOCUMENTS

| 11,425,750 B2* | 8/2022 | Xiong .................. H04W 76/27 |
| 11,985,662 B2* | 5/2024 | Cheng .................. H04L 5/0044 |
| 2012/0300751 A1* | 11/2012 | Arai ...................... H04L 1/0026 370/336 |
| 2017/0208574 A1 | 7/2017 | Ramakrishna et al. |
| 2019/0098601 A1* | 3/2019 | Kumar ............... H04W 72/563 |
| 2019/0104515 A1* | 4/2019 | Li ........................ H04L 1/1887 |
| 2019/0159156 A1* | 5/2019 | Abedini ............ H04W 56/0005 |
| 2019/0174466 A1 | 6/2019 | Zhang et al. |

(Continued)

FOREIGN PATENT DOCUMENTS

| CN | 106105084 A | 11/2016 |
| CN | 110519025 A | 11/2019 |

(Continued)

OTHER PUBLICATIONS

International Search Report and Written Opinion for PCT Appl. No. PCT/CN2020/075859 mailed Nov. 24, 2020 (8 pages).

(Continued)

*Primary Examiner* — Bailor C Hsu
(74) *Attorney, Agent, or Firm* — Foley & Lardner LLP

(57) ABSTRACT

A system and method of providing an enhanced downlink (DL)-uplink (UL) timing relationship. The system and method include identifying, by a first wireless communication device, an offset between a first time-domain tag at which the first wireless communication device detects a signal transmitted from a wireless communication node and a second time-domain tag at which the first wireless communication device applies the signal. In some embodiments, the offset includes at least one of a common offset portion or a user equipment (UE)-specific offset portion.

17 Claims, 14 Drawing Sheets

(56) References Cited

U.S. PATENT DOCUMENTS

| | | | |
|---|---|---|---|
| 2020/0266867 A1* | 8/2020 | Park | H04B 7/0478 |
| 2021/0153193 A1* | 5/2021 | Lin | H04W 56/0045 |
| 2021/0314889 A1* | 10/2021 | Rico Alvarino | H04W 56/0045 |
| 2022/0124795 A1* | 4/2022 | Wu | H04W 56/0045 |
| 2023/0133633 A1* | 5/2023 | Park | H04W 36/32 370/331 |
| 2023/0135149 A1* | 5/2023 | Krishnamurthy | H04W 56/0015 455/456.1 |
| 2023/0164720 A1* | 5/2023 | Huang | H04W 24/10 370/350 |
| 2023/0189345 A1* | 6/2023 | Khoshkholgh Dashtaki | H04B 7/1853 370/329 |

FOREIGN PATENT DOCUMENTS

| | | |
|---|---|---|
| CN | 110768763 A | 2/2020 |
| WO | WO-2018/128187 A1 | 7/2018 |
| WO | WO-2018/175596 A1 | 9/2018 |
| WO | WO-2020/031155 A1 | 2/2020 |

OTHER PUBLICATIONS

ZTE et al.: "Mode 1 resource allocation schemes on sidelink" 3GPP TSG RAN WGI #99; R1-1912552; Nov. 22, 2019(Nov. 22, 2019)Reno, Nevada, US (9 pages).

"3rd Generation Partnership Project; Technical Specification Group Radio Access Network; Solutions for NR to support non-terrestrial networks (NTN) (Release 16)", 3GPP Standard; Technical Report; 3GPP TR 38.821, Cedex, France, Oct. 4, 2019 (91 pages).

CMCC: "Discussion on UL transmission timing for NTN", 3GPP DRAFT; R1-1912535, Reno, USA, Nov. 9, 2019 (3 pages).

Extended European Search Report on European Patent Appln. No. 20890839.2, dated Feb. 24, 2023 (7 pages).

Ericsson, "TP for section 6.2 in TR 38.821 on NTN PHY control procedures", 3GPP TSG-RAN WG1 Meeting #99, R1-1913402, Nov. 22, 2019, Reno, USA (18 pages).

First Office Action for JP Appl. No. 2022-538189, dated Aug. 8, 2023 (with English translation, 11 pages).

First Office Action for CN Appl. No. 202080093473.4, dated Oct. 25, 2024 (with English translation, 22 pages).

* cited by examiner

Table 1 components of extend offset in different use cases

| Components of extended offset | Example of use cases |
|---|---|
| Common part | UE group specific operation |
| UE specific part | HAPS |
| Common part and UE specific part | GEO |

Case 1
Case 2
Case 3

FIG. 11

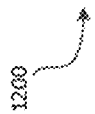

FIG. 12

| | Components of extended offset | acquisition methods | Example of use cases |
|---|---|---|---|
| Case A | Common part | Signaling | UE group specific operation |
| | | UE calculation | |
| Case B | UE specific part | Signaling | |
| | | UE calculation | HAPS |
| Case C | Common part and UE specific part | Signaling both | |
| | | UE calculation both | |
| | | signaling common part, UE calculation the other one. | GEO |
| | | signaling UE specific part, UE calculation the other one. | |

SYSTEM AND METHOD OF DOWNLINK-UPLINK TIMING RELATIONSHIP

CROSS-REFERENCE TO RELATED APPLICATION

This application claims the benefit of priority under 35 U.S.C. § 120 as a continuation of PCT Patent Application No. PCT/CN2020/075859, filed on Feb. 19, 2020, the disclosure of which is incorporated herein by reference in its entirety.

TECHNICAL FIELD

The disclosure relates generally to wireless communications and, more particularly, to systems and methods for an enhanced downlink (DL)-uplink (UL) timing relationship.

BACKGROUND

The standardization organization Third Generation Partnership Project (3GPP) is currently in the process of specifying a new Radio Interface called 5G New Radio (5G NR). The 5G NR implements a mechanism called Timing Advance (TA) that adjusts the uplink frame timing relative to the downlink frame timing. The TA may be derived from the UL received timing and sent by the gNB to the UE. The UE may use the TA to advance or delay its timings of transmissions to the gNB so as to compensate for propagation delay and thus time align the transmissions from different UEs with the receiver window of the gNB. Depending on the telecommunication application, the adjustment may be performed on a per-need basis.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes identifying, by a first wireless communication device, an offset between a first time-domain tag at which the first wireless communication device detects a signal transmitted from a wireless communication node and/or a second time-domain tag at which the first wireless communication device applies the signal. In some embodiments, the offset includes at least one of a common offset portion or a user equipment (UE)-specific offset portion.

In some embodiments, the method includes transmitting, by the first wireless communication device, the data according to the scheduling. In some embodiments, the method includes applying, by the first wireless communication device, the configuration from the wireless communication node. In some embodiments, the method includes transmitting, by the first wireless communication device, the feedback of receiving signaling.

In some embodiments, the first wireless communication device and/or a second wireless communication device identify the same common offset portion, in response to satisfying at least one of the following conditions the first wireless communication device and the second wireless communication device sharing the same time-frequency resource; the first wireless communication device and the second wireless communication device sharing the same demodulation reference signal (DMRS) resource group; the first wireless communication device and the second wireless communication device sharing the same QuasiCo-Location relationship; or the first wireless communication device and the second wireless communication device sharing the same UE group.

In some embodiments, the method includes receiving, by the first wireless communication device from the wireless communication node, an indication. In some embodiments, at least one of the common offset portion or the UE-specific portion is indicated by a System Information Block (SIB), a Radio Resource Control (RRC) signaling, a Downlink Control Information (DCI), or a Medium Access Control (MAC) Control Element (CE).

In some embodiments, the method includes obtaining, by the first wireless communication device, at least one of the common offset portion or the UE-specific offset portion based on at least one of a timing advanced value indicated by the wireless communication node; a timing advanced value calculated by the first wireless communication device; or a timing advanced value reported by the first wireless communication device.

In some embodiments, the method includes the timing advanced value includes a common TA.

In some embodiments, the method includes generating, by the first wireless communication device, the common offset portion by dividing a common TA by a time interval of a slot or a time interval of a frame.

In some embodiments, the timing advanced value is indicated by the wireless communication node by at least one of: broadcasting information received by the wireless communication device; system information block (SIB) information received by the wireless communication device; or a Radio Resource Control (RRC) configuration message received by the wireless communication device.

In some embodiments, the timing advanced value is calculated by the wireless communication device based on at least one of: a location of the first wireless communication device; or a location information of satellite associated with the wireless communication node.

In some embodiments, the location of the first wireless communication device corresponds to a reference point in an area associated with the wireless communication node.

In some embodiments, the reference point is configured by the wireless communication node.

In some embodiments, a unit of the common offset portion is either a slot or a frame. In some embodiments, a unit of the UE-specific offset portion is either a slot or a frame.

In some embodiments, the method includes receiving, by the first wireless communication device via signaling, at least one of the unit of the common offset portion or the unit of the UE-specific offset portion.

In some embodiments, at least one of the unit of the common offset portion or the unit of the UE-specific offset portion is predefined.

In some embodiments, the unit of the common offset portion is predefined to be the frame.

In some embodiments, the unit of the UE-specific offset portion is predefined to be the slot.

In some embodiments, the signal includes at least one of a downlink control information (DCI) signal, a random access response (RAR) signal, or a medium access control (MAC) control element (CE).

In some embodiments, applies the signal comprises: transmitting, by the first wireless communication device, a physical uplink shared channel (PUSCH); or transmitting, by the first wireless communication device, a hybrid automatic repeat request-acknowledgement (HARQ-ACK) on a physical uplink control channel (PUCCH); or transmitting, by the first wireless communication device, a channel state information (CSI) report; or applying, by the first wireless communication device, a configuration by a medium access control (MAC) control element (CE); or transmitting, by the first wireless communication device, a sounding reference signal (SRS).

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 11 illustrates a table 1100 of example definitions for components of extended offset for different use cases, in accordance with an embodiment of the present disclosure.

FIG. 12 illustrates a table 1200 of example definitions for extended offset acquisition methods for different use cases, in accordance with an embodiment of the present disclosure.

DETAILED DESCRIPTION OF EXEMPLARY EMBODIMENTS

Figure 1:
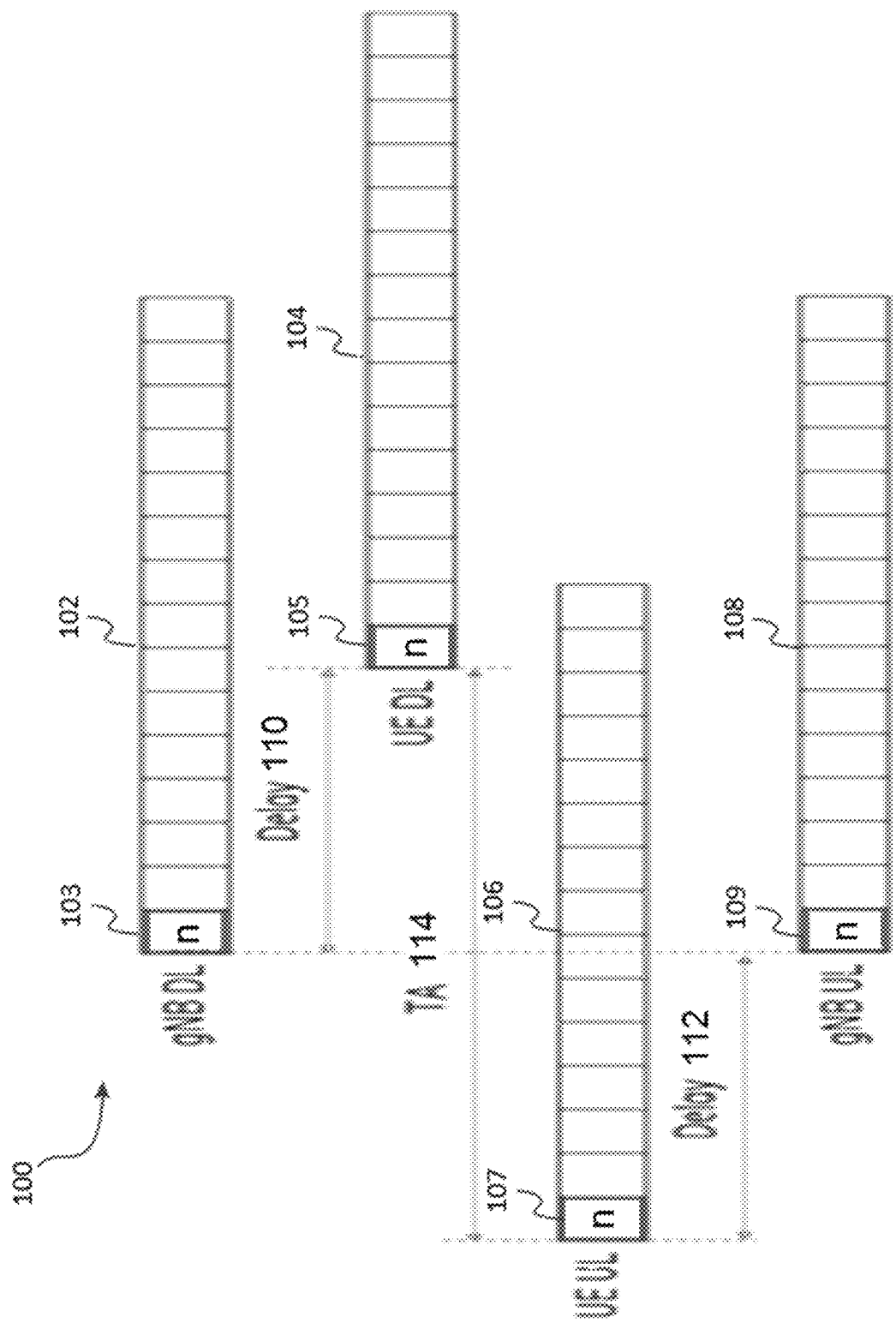
FIG. 1 is a block diagram depicting an example environment of a timing advance (TA) in NR, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
CSI Channel State Information
DCI Downlink Control Information
DL Down Link or Downlink
GEO Geostationary Earth Orbit
HAPS High Altitude Platform Station
HARQ-ACK Hybrid Automatic Repeat Request—Acknowledge
ISL Inter-Satellite Links
LEO Low Earth Orbit
MAC Media Access Control
MEO Medium Earth Orbit
NR Next Generation RAN
NTN Non-Terrestrial Network
PDCP Packet Data Convergence Protocol
PUCCH Physical Uplink Control Channel
PUSCH Physical Uplink Shared Channel
RAN Radio Access Network
RAR Random Access Response
RRC Radio Resource Control
RTT Round Trip Time
SIB System Information Block
SRS Sounding Reference Signal TA Timing Advance
UAS Unmanned Aerial System Platform
UE User Equipment
UL Up Link or Uplink With the rapid development of terrestrial network, the network (e.g., BS 302 in FIG. 3) service quality can be further guaranteed. The limit of a terrestrial network is that the service coverage cannot be reliably provided in isolated/remote areas, on board aircrafts or vessels, and in rural areas. In order to extend the coverage, the network service may be use, in part, with a Non-Terrestrial Network (NTN) that includes networks (e.g., BS 302 in FIG. 3), or segments of networks, and/or airborne or space-borne vehicles (e.g., satellites) to embark a transmission equipment relay node or base station.

Compared with terrestrial mobile systems, the propagation distance in NTN leads to long propagation delay, which ranges from several milliseconds to hundreds of milliseconds. Such long propagation delay results in the adjustment of timing aspects in NR, especially including timing advance (TA) mechanism. That is, according to the Next Generation (NR) Radio Access Network's (RAN) mechanism, an aligned DL-UL frame boundary at the gNB (sometimes referred to as, "wireless communication node") side may be achieved by using a timing advance (TA) mechanism at the UE (sometimes referred to as, "wireless communication device") side. A TA mechanism may be when a gNB measures the required TA based on the received UE signal and commands the UE to adjust the transmission time in order to advance/delay its timings of transmissions to the gNB. These adjustments in the transmission time may allow the UE and/or the gNB to compensate for propagation delay, and thus may time align the transmissions from different UEs with the receiver window of the gNB. Depending on the telecommunication application, this adjustment may be performed on a per-need basis.

For example, FIG. 1 is a block diagram depicting an example environment 100 of a timing advance (TA) in NR, in accordance with an embodiment of the present disclosure. The environment 100 includes a frame 102 (shown in FIG. 3 as, "gNB DL") that may be transmitted from a BS (e.g., BS 302 in FIG. 3) to a UE (e.g., UE 304 in FIG. 3) and containing a plurality of slots, where a first slot (e.g., in chronological order) of the plurality of slots is identified as slot 103 (shown in FIG. 3 as "n"). The environment 100 includes a frame 104 (shown in FIG. 1 as, "UE DL") that may be received by a UE from a BS and containing a plurality of slots, where a first slot (e.g., in chronological order) of the plurality of slots is identified as slot 105 (shown in FIG. 1 as "n").

The environment 100 includes a frame 106 (shown in FIG. 1 as, "UE UL") that may be transmitted from a UE to a BS and containing a plurality of slots, where a first slot (e.g., in chronological order) of the plurality of slots is identified as slot 107 (shown in FIG. 1 as "n"). The environment 100 includes a frame 108 (shown in FIG. 1 as, "gNB DL") that may be received by a BS from a UE and containing a plurality of slots, where a first slot (e.g., in chronological order) of the plurality of slots is identified as slot 109 (shown in FIG. 1 as "n").

Specifically, frame 102 shows the transmission of a "first" frame from the BS, and frame 104 shows the receipt of the "first" frame by the UE. Frame 106 shows the transmission of a "second" frame from the UE, and frame 108 shows the receipt of the "second" frame by the BS.

As shown in FIG. 1, delay 110 indicates a delay in time between the transmission of the "first frame" (as measured at the beginning of slot 103 of frame 102) by the BS, to the receipt of the "first" frame (as measured at the beginning of slot 105 of frame 104) by the UE. Delay 112 indicates a delay in time between the transmission of the "second frame" (as measured at the beginning of slot 107 of frame 106) by the UE, to the receipt of the "second" frame (as measured at the beginning of slot 109 of frame 108) by the BS. TA 114 indicates a delay in time between the transmission of the "second frame" (as measured at the beginning of slot 107 of frame 106) by the UE, to the receipt of the "first" frame (as measured at the beginning of slot 105 of frame 104) by the UE.

Figure 2:
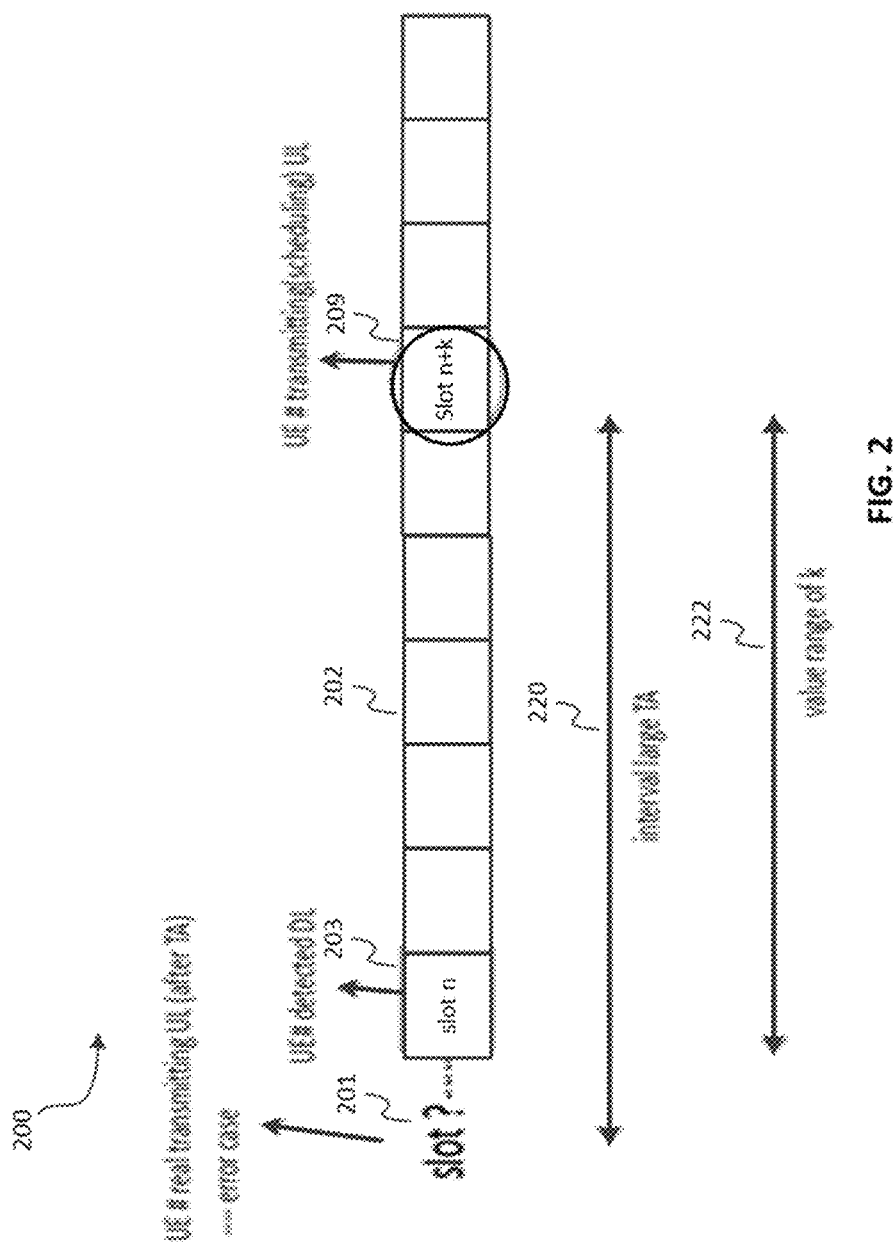
FIG. 2 is a block diagram depicting an example environment of a timing advance (TA) in NR, in accordance with an embodiment of the present disclosure.

FIG. 2 is a block diagram depicting an example environment 200 of a timing advance (TA) in NR, in accordance with an embodiment of the present disclosure. The environment 200 includes a frame 202 that may be received at UE side or transmitted from a UE to a BS and containing a plurality of slots. In some embodiments, slot 203 may correspond with a "UE # detected DL". In some embodiments, slot 209 (shown in FIG. 2 as, "slot n+k") may correspond with a "UE # transmitting (scheduling) UL without TA procession". In some embodiments, slot 201 (shown in FIG. 2 as, "slot?") may correspond with a "UE # transmitting UL with TA procession". Slot 201 (shown in FIG. 2 as, "slot?") occurs before slot 203 (shown in FIG. 2 as "slot n").

TA 220 (shown in FIG. 2 as, "interval large TA") indicates TA action of slot 209 in time. Time offset 222 (shown in FIG. 2 as, "value range of k") indicates a offset in time between the beginning of the slot 203 and the slot 209. In an embodiment, time offset 222 (shown in FIG. 2 as, "value range of k") indicates a offset in time between the end of the slot 203 and the slot 209.

For NR, the existing NR DL-UL timing relationship may define the timing interval between the received DL slot/frame and the (scheduling) transmitting UL/DL slot/frame at the UE side. In response to the UE # detecting a DL slot in slot 203 (e.g., slot n), and the corresponding UL slot would be scheduled in the slot 209 (e.g., slot n+k), with TA processing, the UE should transmit the UL slot behind the detected DL slot.

An UL signal (e.g., frame 106 and/or frame 108 in FIG. 1, frame 202 in FIG. 2) may include a PUSCH, a HARQ-ACK on PUCCH, a CSI report, a MAC CE action timing, and/or an SRS. In some embodiments, a timing relationship may include the UE detecting a DL slot carrying DCI and transmitting the DCI granted PUSCH in the following (e.g., subsequent) UL slot.

However, the propagation delay and the TA in NTN applications (e.g., up to hundreds of milliseconds) may be much larger than that in NR (e.g., less than 1 millisecond). Consequently, under the current NR timing relationship, the range of timing offset may no longer meet the requirement of large TA compensation. That is, the slot 203 (e.g., UE # detected DL slot), and the corresponding UL slot may be scheduled in the slot 209 (e.g., slot n+k). If the parameter k remains unchanged, then an error case (e.g., UE transmitting UL before UE detected DL) may occur when the interval TA is larger than maximum value of k.

Accordingly, the system and method discussed herein provide an enhanced downlink (DL)-uplink (UL) timing relationship in NTN by (1) providing an extended offset for NTN, (2) fully revealing the potential structures for the offset, (3) designing acquisition methods for the portions of the offset, and (4) modifying the granularity or unit of the offset.

By way of a non-limiting example, as discussed in greater detail below with respect to FIG. 7, the embodiments described herein may include one or more of the following features:

A "first feature" relates to the UE obtaining one or more parameters for the timing interval calculation at the UE side based on different UE capabilities.

A "second feature" relates to the BS implementing signaling methods of one or more parameters (e.g., common TA, differential TA, etc.).

A "third feature" relates to the UE and/or the BS obtaining, with assistance of the one or more parameters, a DL-UL timing relationship for different use cases.

A "fourth feature" relates to providing a timing offset to guarantee the alignment of DL-UL frame timing.

A "fifth feature" relates to revealing the components of timing offset.

A "sixth feature" relates to a design of acquisition methods of the components of timing offset.

A "seventh feature" relates to enlarging the unit of timing offset.

1. Mobile Communication Technology and Environment

Figure 3:
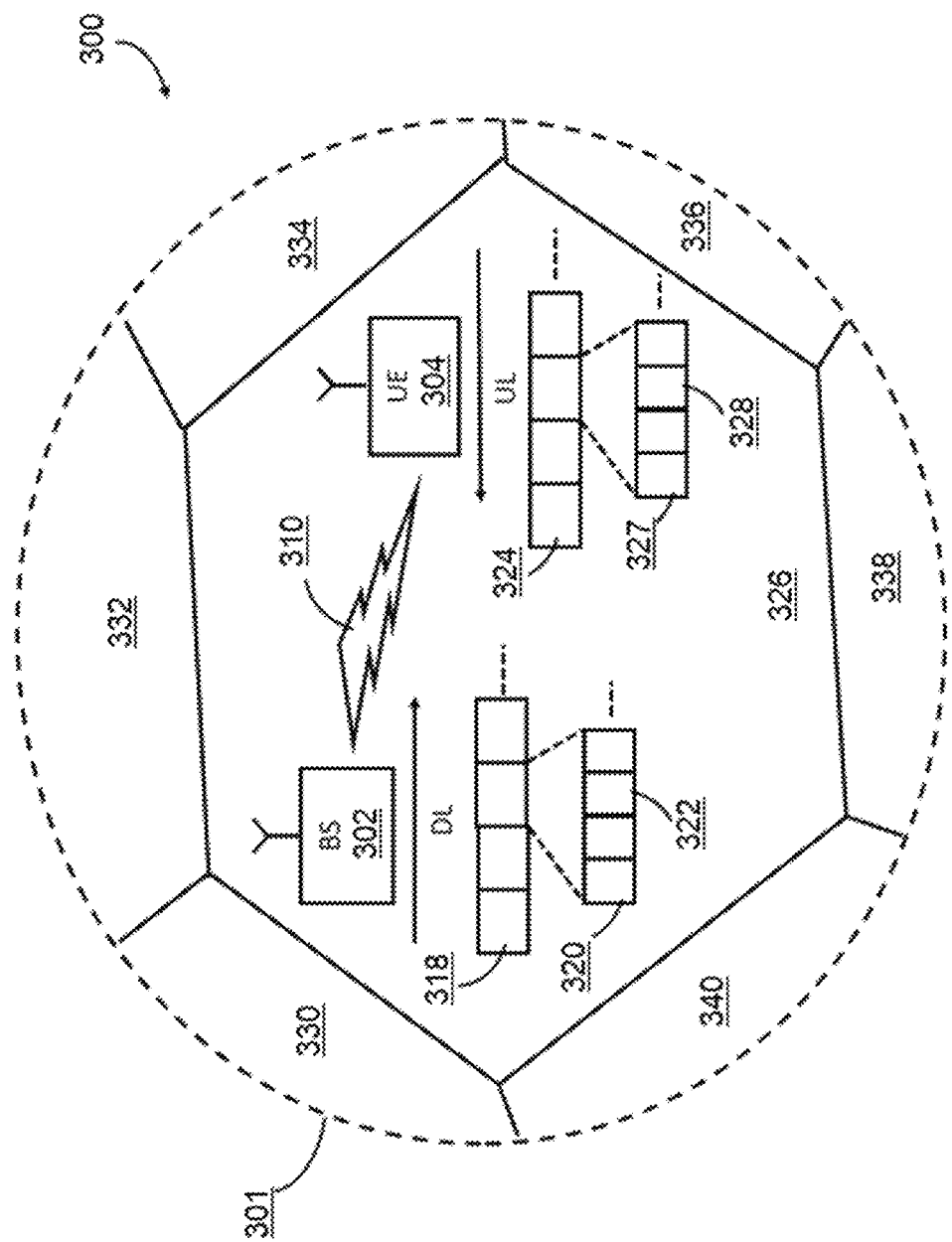
FIG. 3 illustrates an example cellular communication network in which techniques disclosed herein may be implemented, in accordance with an embodiment of the present disclosure.

FIG. 3 illustrates an example wireless communication network, and/or system, 300 in which techniques disclosed herein may be implemented, in accordance with an embodiment of the present disclosure. In the following discussion, the wireless communication network 300 may be any wireless network, such as a cellular network or a narrowband Internet of things (NB-IoT) network, and is herein referred to as "network 300." Such an example network 300 includes a base station 302 (hereinafter "BS 302"; also referred to as wireless communication node) and a user equipment device 304 (hereinafter "UE 304"; also referred to as wireless communication device) that can communicate with each other via a communication link 310 (e.g., a wireless communication channel), and a cluster of cells 326, 330, 332, 334, 336, 338 and 340 overlaying a geographical area 301. In FIG. 3, the BS 302 and UE 304 are contained within a respective geographic boundary of cell 326. Each of the other cells 330, 332, 334, 336, 338 and 340 may include at least one base station operating at its allocated bandwidth to provide adequate radio coverage to its intended users.

For example, the BS 302 may operate at an allocated channel transmission bandwidth to provide adequate coverage to the UE 304. The BS 302 and the UE 304 may communicate via a downlink radio frame 318, and an uplink radio frame 324 respectively. Each radio frame 318/324 may be further divided into sub-frames 320/327 which may include data symbols 322/328. In the present disclosure, the BS 302 and UE 304 are described herein as non-limiting examples of "communication nodes," generally, which can practice the methods disclosed herein. Such communication nodes may be capable of wireless and/or wired communications, in accordance with various embodiments of the present solution.

Figure 4:
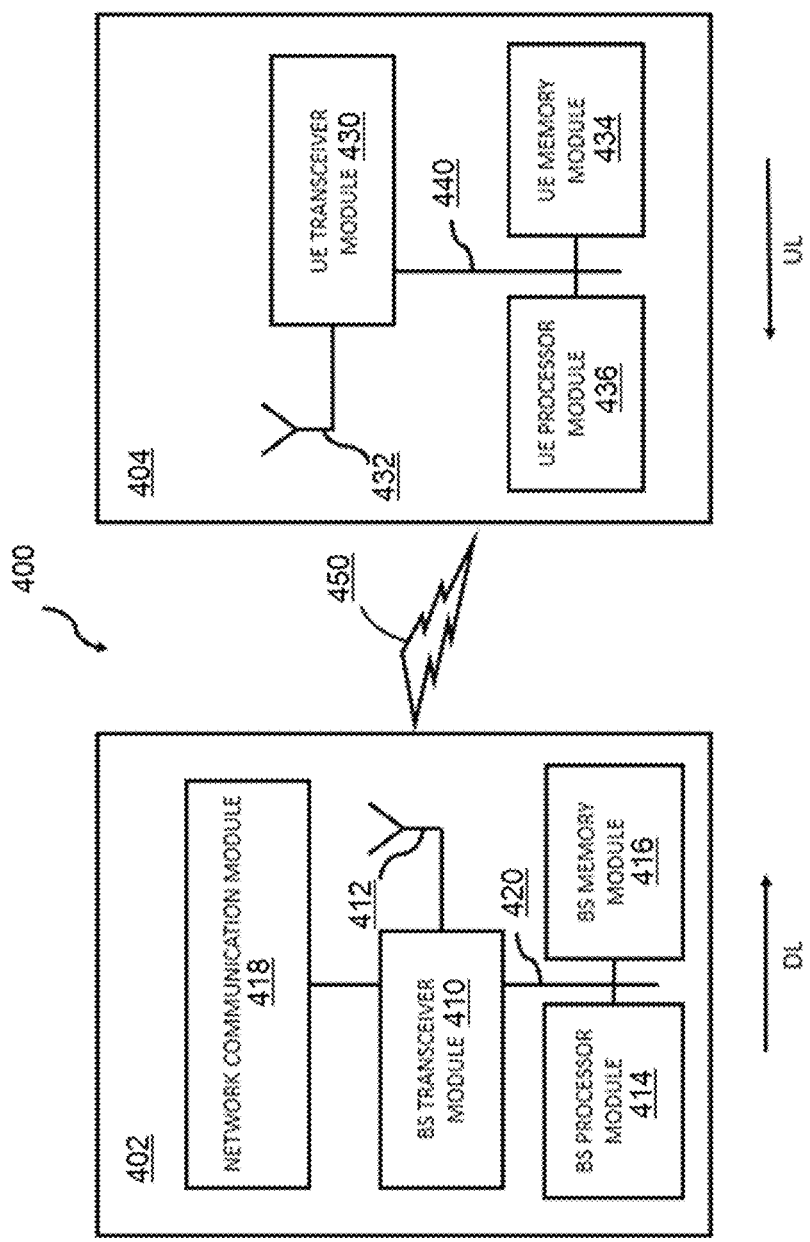
FIG. 4 illustrates block diagrams of an example base station and a user equipment device, in accordance with some embodiments of the present disclosure.

FIG. 4 illustrates a block diagram of an example wireless communication system 400 for transmitting and receiving wireless communication signals (e.g., OFDM/OFDMA signals) in accordance with some embodiments of the present solution. The system 400 may include components and elements configured to support known or conventional operating features that need not be described in detail herein. In one illustrative embodiment, system 400 can be used to communicate (e.g., transmit and receive) data symbols in a wireless communication environment such as the wireless communication environment 300 of FIG. 3, as described above.

System 400 generally includes a base station 402 (hereinafter "BS 402") and a user equipment device 404 (hereinafter "UE 404"). The BS 402 includes a BS (base station) transceiver module 410, a BS antenna 412, a BS processor module 414, a BS memory module 416, and a network communication module 418, each module being coupled and interconnected with one another as necessary via a data communication bus 420. The UE 404 includes a UE (user equipment) transceiver module 430, a UE antenna 432, a UE memory module 434, and a UE processor module 436, each module being coupled and interconnected with one another as necessary via a data communication bus 440. The BS 402 communicates with the UE 404 via a communication channel 450, which can be any wireless channel or other medium suitable for transmission of data as described herein.

As would be understood by persons of ordinary skill in the art, system 400 may further include any number of modules other than the modules shown in FIG. 4. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 430 may be referred to herein as an "uplink" transceiver 430 that includes a radio frequency (RF) transmitter and a RF receiver each comprising circuitry that is coupled to the antenna 432. A duplex switch (not shown) may alternatively couple the uplink transmitter or receiver to the uplink antenna in time duplex fashion. Similarly, in accordance with some embodiments, the BS transceiver 410 may be referred to herein as a "downlink" transceiver 410 that includes a RF transmitter and a RF receiver each comprising circuity that is coupled to the antenna 412. A downlink duplex switch may alternatively couple the downlink transmitter or receiver to the downlink antenna 412 in time duplex fashion. The operations of the two transceiver modules 410 and 430 may be coordinated in time such that the uplink receiver circuitry is coupled to the uplink antenna 432 for reception of transmissions over the wireless transmission link 450 at the same time that the downlink transmitter is coupled to the downlink antenna 412. Conversely, the operations of the two transceivers 410 and 430 may be coordinated in time such that the downlink receiver is coupled to the downlink antenna 412 for reception of transmissions over the wireless transmission link 450 at the same time that the uplink transmitter is coupled to the uplink antenna 432. In some embodiments, there is close time synchronization with a minimal guard time between changes in duplex direction.

The UE transceiver 430 and the base station transceiver 410 are configured to communicate via the wireless data communication link 450, and cooperate with a suitably configured RF antenna arrangement 412/432 that can support a particular wireless communication protocol and modulation scheme. In some illustrative embodiments, the UE transceiver 410 and the base station transceiver 410 are configured to support industry standards such as the Long Term Evolution (LTE) and emerging 5G standards, and the like. It is understood, however, that the present disclosure is not necessarily limited in application to a particular standard and associated protocols. Rather, the UE transceiver 430 and the base station transceiver 410 may be configured to support alternate, or additional, wireless data communication protocols, including future standards or variations thereof.

In accordance with various embodiments, the BS 402 may be an evolved node B (eNB), a serving eNB, a target eNB, a femto station, or a pico station, for example. In some embodiments, the UE 404 may be embodied in various types of user devices such as a mobile phone, a smart phone, a personal digital assistant (PDA), tablet, laptop computer, wearable computing device, etc. The processor modules 414 and 436 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 414 and 436, respectively, or in any practical combination thereof. The memory modules 416 and 434 may be realized as RAM memory, flash memory, ROM memory, EPROM memory, EEPROM memory, registers, a hard disk, a removable disk, a CD-ROM, or any other form of storage medium known in the art. In this regard, memory modules 416 and 434 may be coupled to the processor modules 410 and 430, respectively, such that the processors modules 410 and 430 can read information from, and write information to, memory modules 416 and 434, respectively. The memory modules 416 and 434 may also be integrated into their respective processor modules 410 and 430. In some embodiments, the memory modules 416 and 434 may each include a cache memory for storing temporary variables or other intermediate information during execution of instructions to be executed by processor modules 410 and 430, respectively. Memory modules 416 and 434 may also each include non-volatile memory for storing instructions to be executed by the processor modules 410 and 430, respectively.

The network communication module 418 generally represents the hardware, software, firmware, processing logic, and/or other components of the base station 402 that enable bi-directional communication between base station transceiver 410 and other network components and communication nodes configured to communication with the base station 402. For example, network communication module 418 may be configured to support internet or WiMAX traffic. In a typical deployment, without limitation, network communication module 418 provides an 802.3 Ethernet interface such that base station transceiver 410 can communicate with a conventional Ethernet based computer network. In this manner, the network communication module 418 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Overview of a Non-Terrestrial Network

Figure 5:
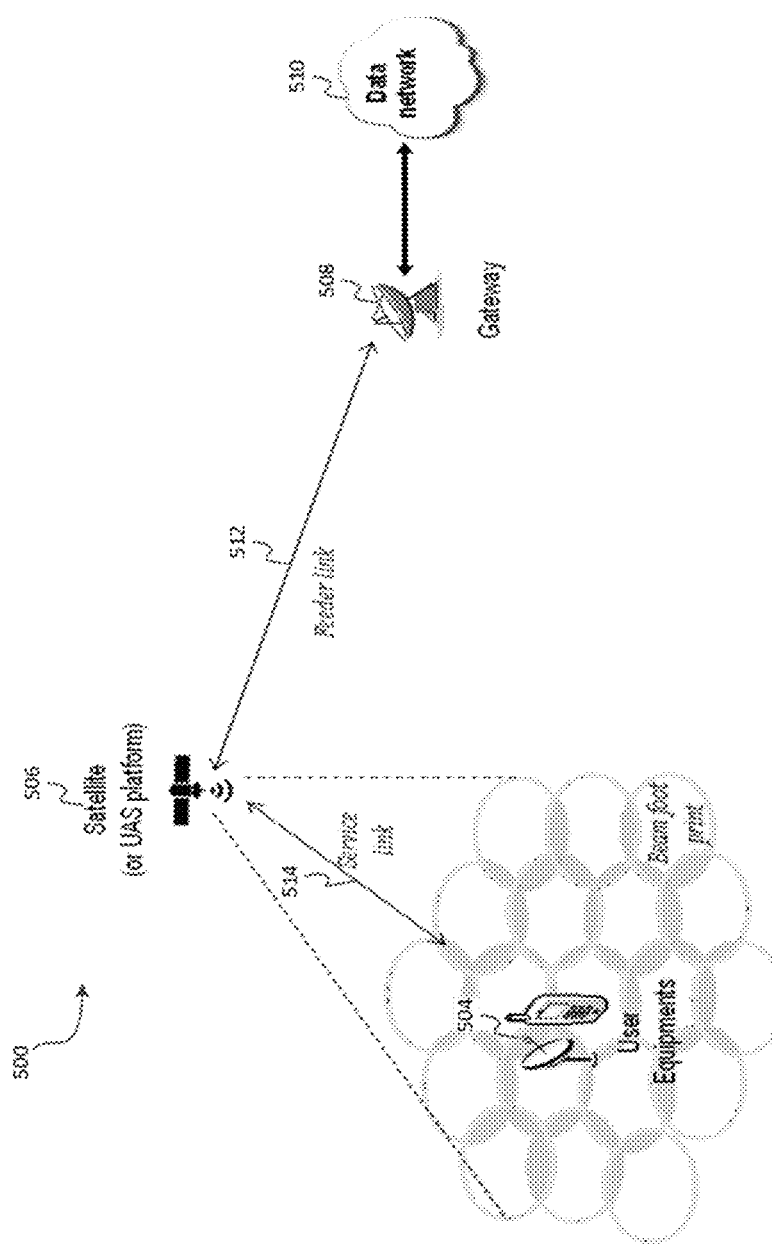
FIG. 5 is a block diagram depicting an example non-terrestrial network based on transparent payload, in accordance with an embodiment of the present disclosure.

FIG. 5 is a block diagram depicting an example non-terrestrial network 500 based on transparent payload, in accordance with an embodiment of the present disclosure. The non-terrestrial network 500 may include a UE 504, a BS 304, and/or a satellite 506. The non-terrestrial network 500 may include a gateway 508 for connecting the non-terrestrial network 500 to a data network 510 (e.g., public or private). A feeder link 512 connects the satellite 506 to the gateway 508. A service link 514 connects the satellite 506 to the UE 504.

In some embodiments, the BS 304 may be positioned on the earth near (e.g., proximate, adjacent) the gateway 508. In some embodiments, the beam footprint may be larger cell than the cell of the non-terrestrial network 500. In some embodiments, a transparent payload may be include a radio frequency filtering, a frequency conversion, and/or an amplification; thus, a waveform signal repeated by the payload may be un-changed.

Figure 6:
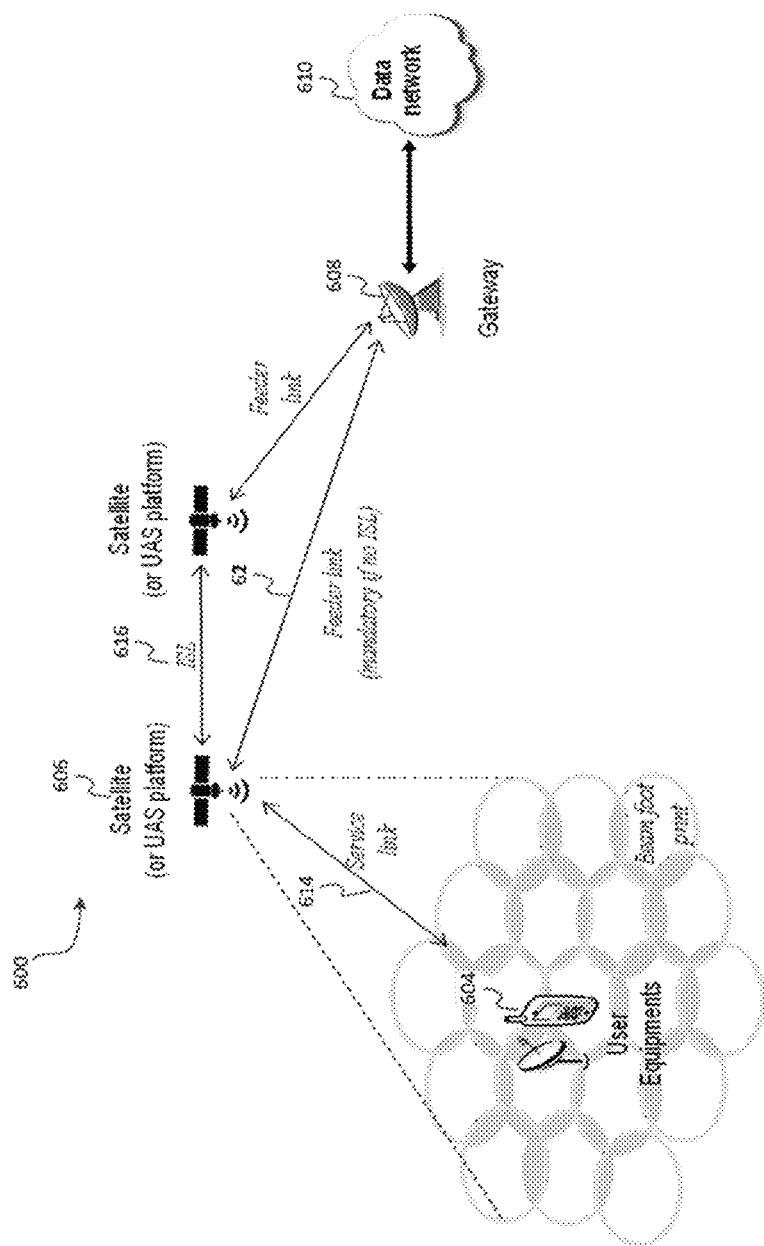
FIG. 6 is a block diagram depicting an example non-terrestrial network based on regenerative payload, in accordance with an embodiment of the present disclosure.

FIG. 6 is a block diagram depicting an example non-terrestrial network 600 based on regenerative payload, in accordance with an embodiment of the present disclosure. The non-terrestrial network 600 may include a UE 604, a BS 304, and/or a satellite 606. The non-terrestrial network 600 may include a gateway 608 for connecting the non-terrestrial network 600 to a data network 610 (e.g., public or private). A feeder link 612 connects the satellite 606 to the gateway 608. A service link 614 connects the satellite 606 to the UE 604. In some embodiments, the BS 304 may be positioned on-board the satellite 606. An inter-satellite link (ISL) 616 connects the satellite 606 to the UE 604. In some embodiments, the BS 304 may be positioned on-board the satellite 606. In some embodiments, the beam footprint may be larger cell than the cell of the non-terrestrial network 600. In some embodiments, a regenerative payload may be include a radio frequency filtering, a frequency conversion, an amplification; demodulation/decoding, switch and/or routing, and/or coding/modulation; thus, all or part of base station functions (e.g., gNB, BS 304 in FIG. 3) may be on-board the satellite 606, or UAS platform. In some embodiments, the non-terrestrial network 600 may include a constellation of LEO and/or MEO. In some embodiments, a LEO includes orbit around the Earth with an altitude between 300 kilometers and 1500 kilometers. In some embodiments, a MEO includes a region of space around the Earth above the LEO and below Geostationary Earth Orbit (GEO).

Still referring to FIG. 5 and FIG. 6, satellite 506 and/or satellite 606 may be a geostationary (GEO) satellite or a non-GEO satellite. A GEO satellite may be fed by one or more gateways (e.g., gateway 508, gateway 608) which may be deployed across a satellite targeted coverage (e.g. regional or even continental coverage). In some embodiments, a UE in a cell is served by only one gateway. A non-GEO satellite may be served successively by one or more gateways (e.g., gateway 508, gateway 608) at a time; thereby ensuring that a service link and a feeder link continuity between the successive serving gateways with sufficient time duration to proceed with mobility anchoring and hand-over. In some embodiments, one or more GEO satellites and/or one or more UAS may be used to provide continental, regional and/or local service.

Satellite 506 and/or satellite 606, or a UAS platform, may implement either a transparent or a regenerative (e.g., with on board processing) payload. The satellite 506 and/or satellite 606, or UAS platform, may generate beams over a given service area bounded by its field of view. In some embodiments, the footprints of the beams may be of elliptic shape. The field of view of the satellite 506 and/or satellite 606, or UAS platforms, may depend on the on-board antenna diagram and/or minimum elevation angle.

In some embodiments, the non-terrestrial network 500 based on transparent payload may be different than the non-terrestrial network 600 based on regenerative payload in at least some respects. For example, the transparent payload from the service link 514 between the UE 504 and the satellite 506 to the feeder link 512 between the satellite 506 and the gateway 508 may be unchanged. On the contrary, the regenerative payload may be received on board satellite from the UE 604 to the satellite 606; thus, the signal may be changed.

3. Examples of DL-UL Timing Relationship

In some embodiments, if the UL signal includes HARQ-ACK on PUCCH, then a Legacy UE procedure may be used for reporting HARQ-ACK in NR. In some embodiments, for PDSCH reception ending in slot n (e.g., slot 103 in FIG. 1, slot 203 in FIG. 2), then the UE (UE 302 in FIG. 3) may transmit the PUCCH in slot n+k (e.g., slot 209 in FIG. 2). In some embodiments, k may be indicated by DCI or a higher layer parameter "dl-DataToUL-ACK".

In some embodiments, for DCI format 1_0, the value of k may be {1, 2, 3, 4, 5, 6, 7, 8}. In some embodiments, for higher layer parameter dl-DataToUL-ACK, {1st value, 2nd value . . . 8th value}, k may be indicated by higher layer parameter when detected DCI format 1_1 does not include a PDSCH-to-HARQ-timing-indicator field. In some embodiments, the value of k may be SEQUENCE (SIZE (1 . . . 8)) OF INTEGER (0 . . . 15)).

3.1 PDSCH Reception Timing

With respect to PDSCH reception timing, in some embodiments, when the UE (e.g., UE 304 in FIG. 3) is scheduled to receive PDSCH by a DCI, the DCI may indicate a slot offset (e.g., $K_0$).

In some embodiments, the slot allocated for the PDSCH may be defined based on Equation 2.

$$\left\lfloor n \cdot \frac{2^{\mu_{PDSCH}}}{2^{\mu_{PDCCH}}} \right\rfloor + K_0 \qquad (2)$$

where, n is the slot with the scheduling DCI, $K_0$ is based on the numerology of PDSCH, $\mu_{PDSCH}$ and $\mu_{PDCCH}$ are the subcarrier spacing configurations for PDSCH and PDCCH, respectively; and the value of $K_0$ is in the range of 0, . . . , 32.

3.2 Transmission Timing For PUSCH Scheduled by DCI

With respect to a transmission timing for PUSCH scheduled by DCI, in some embodiments, when the UE 302 is scheduled to transmit PUSCH by a DCI, the DCI indicates a slot offset (e.g., $K_2$).

In some embodiments, the slot allocated for the PUSCH may be defined based on Equation 3.

$$\left\lfloor n \cdot \frac{2^{\mu_{PUSCH}}}{2^{\mu_{PDCCH}}} \right\rfloor + K_2 \qquad (3)$$

where n is the slot with the scheduling DCI, $K_2$ is based on the numerology of PUSCH, $\mu_{PUSCH}$ and $\mu_{PDCCH}$ are the subcarrier spacing configurations for PUSCH and PDCCH, respectively; and the value of $K_2$ is in the range of 0, . . . , 32.

3.3 Transmission Timing For PUSCH Scheduled by RAR UL Grant

With respect to slots for a PUSCH transmission scheduled by a RAR UL grant, in some embodiments, if a UE 304 receives a PDSCH with a RAR message ending in slot n for a corresponding PRACH transmission from the UE, the UE transmits the PUSCH in slot n+$K_2$+Δ. In some embodiments, $K_2$ and/or Δ may be defined by 3GPP TS 38.214.

3.4 Transmission Timing For HARQ-ACK on PUCCH

With reference to slots for PUCCH transmissions, in some embodiments, for a PDSCH reception ending in slot n or a SPS PDSCH release through a PDCCH reception ending in slot n, the UE 304 provides corresponding HARQ-ACK information in a PUCCH transmission within slot n+$K_1$, where $K_1$ is a number of slots and is indicated by the PDSCH-to-HARQ-timing-indicator field in the DCI format, if present, or provided by dl-DataToUL-ACK. In some embodiments, $K_1$=0 corresponds to the last slot of the PUCCH transmission that overlaps with the PDSCH reception or with the PDCCH reception in case of SPS PDSCH release.

3.5 MAC CE Action Timing

With respect to MAC CE action timing, in some embodiments, when the HARQ-ACK corresponding to a PDSCH carrying a MAC-CE command is transmitted in slot n, the corresponding action and the UE assumption on the downlink configuration indicated by the MAC-CE command may be applied starting from the first slot that is after a second slot that defined by Equation (4)

$$\text{slot } n+3N_{slot}^{subframe,\mu} \qquad (4);$$

where $N_{slot}^{subframe,\mu}$ denotes the number of slots per subframe for subcarrier spacing configuration μ.

3.6 Transmission Timing For CSI on PUSCH

With respect transmission timing for CSI on PUSCH, the transmission timing of CSI on PUSCH may follow the general transmission timing for DCI scheduled PUSCH.

3.7 CSI Reference Resource Timing

With respect CSI reference resource timing, the CSI reference resource for a CSI report in uplink slot n' may be defined by a single downlink slot n−$n_{CSI\_ref}$. In some embodiments, n may be defined based on Equation (5).

$$n = \left\lfloor n' \cdot \frac{2^{\mu_{DL}}}{2^{\mu_{UL}}} \right\rfloor \quad (5)$$

In some embodiments, $\mu_{DL}$ and $\mu_{UL}$ are the subcarrier spacing configurations for DL and UL, respectively. In some embodiments, the value of $n_{CSI\_ref}$ may depend on the type of CSI report and/or be defined by 3GPP on TS 38.214.

3.7 Aperiodic SRS Transmission Timing

With respect to aperiodic SRS transmission timing, in some embodiments, if a UE 304 receives a DCI triggering aperiodic SRS in slot n, the UE 304 transmits aperiodic SRS in each of the triggered SRS resource set(s) in slot $$n \cdot \frac{\mu_{SRS}}{2^{\mu_{PDCCH}}} + k,$$

where k is configured via higher layer parameter slotOffset for each triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the triggering command respectively.

4. Enhancements to the DL-UL Timing Relationship

To enhance the DL-UP timing relationship in NR, a BS 302 and/or a UE 304 may add (e.g., sum, introduce, increase, supplement, etc.) an offset on the top of the legacy timing interval between received DL slot/frame and (scheduling) transmitting UL/DL slot/frame at the UE 304 side. In some embodiments, the offset may include one or more components (e.g., 1 component, 2 components, etc.). In some embodiments, the components may be obtained (e.g., acquired, determined, retrieved, etc.) by signaling and/or by UE 304 calculation itself. As discussed herein, there may be several approaches for enhancing the DL-UP timing relationship in NR for different scenarios and/or embodiments.

Figure 7:
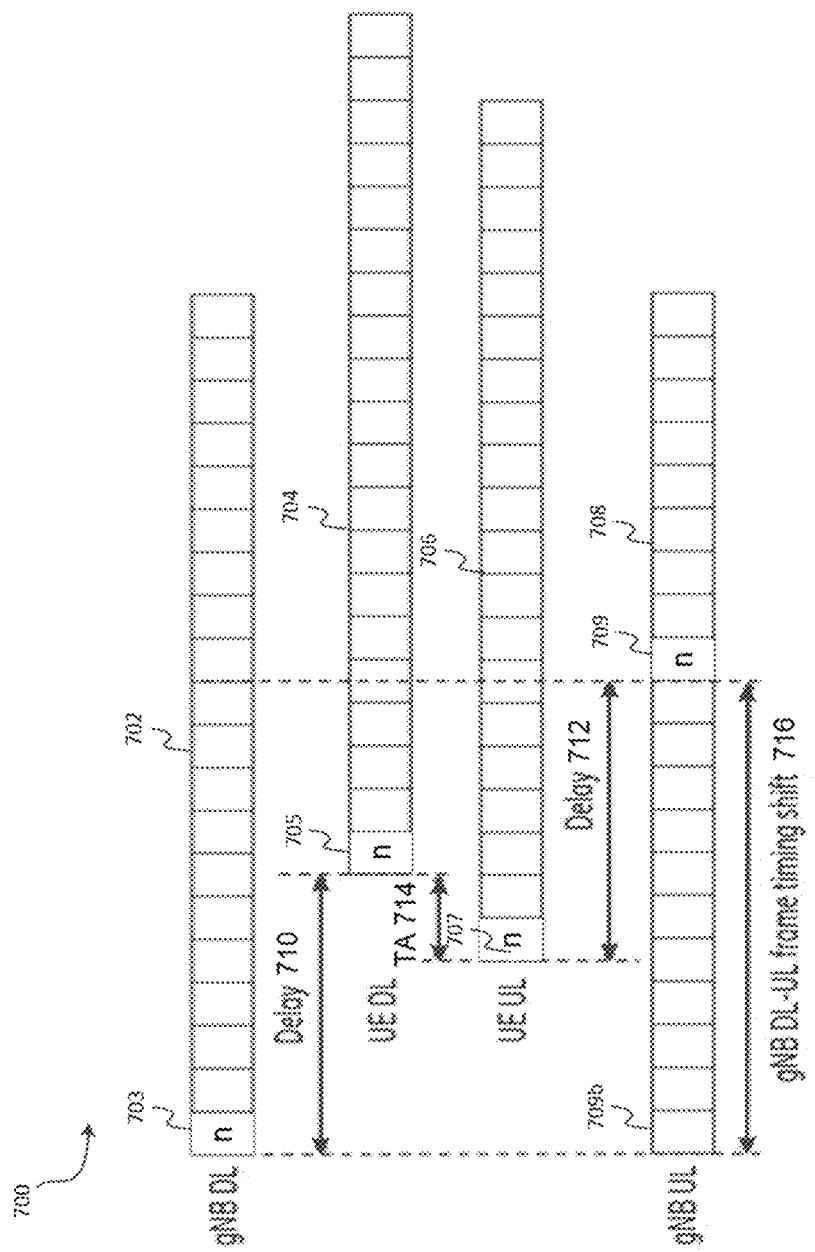
FIG. 7 is a block diagram depicting an example environment of a timing advance (TA) in NR based on UE partly TA compensation, in accordance with an embodiment of the present disclosure.

FIG. 7 is a block diagram depicting an example environment 700 of a timing advance (TA) in NR based on UE partly TA compensation, in accordance with an embodiment of the present disclosure. The environment 700 includes a frame 702 (shown in FIG. 7 as, "gNB DL") that may be transmitted from a BS (e.g., BS 302 in FIG. 3) to a UE (e.g., UE 304 in FIG. 3) and containing a plurality of slots, where a first slot (e.g., in chronological order) of the plurality of slots is identified as slot 703 (shown in FIG. 7 as "n"). The environment 700 includes a frame 704 (shown in FIG. 7 as, "UE DL") that may be received by a UE from a BS and containing a plurality of slots, where a first slot (e.g., in chronological order) of the plurality of slots is identified as slot 705 (shown in FIG. 7 as "n").

The environment 700 includes a frame 706 (shown in FIG. 7 as, "UE UL") that may be transmitted from a UE to a BS and containing a plurality of slots, where a first slot (e.g., in chronological order) of the plurality of slots is identified as slot 707 (shown in FIG. 7 as "n"). The environment 700 includes a frame 708 (shown in FIG. 7 as, "gNB UL") that may be received by a BS from a UE and containing a plurality of slots, where a first slot (e.g., in chronological order) of the plurality of slots is identified as slot 709, The BS need to compensate the offset between slot 709 and slot 709b to achieve time alignment at BS side.

Specifically, frame 702 shows the transmission of a "first" frame from the BS, and frame 704 shows the receipt of the "first" frame by the UE. Frame 706 shows the transmission of a "second" frame from the UE, and frame 708 shows the receipt of the "second" frame by the BS.

As shown in FIG. 7, delay 710 indicates a delay in time between the transmission of the "first frame" (as measured at the beginning of slot 703 of frame 702) by the gNB, to the receipt of the "first" frame (as measured at the beginning of slot 705 of frame 704) by the UE. Delay 712 indicates a delay in time between the transmission of the "second frame" (as measured at the beginning of slot 707 of frame 706) by the UE, to the receipt of the "second" frame (as measured at the beginning of slot 709 of frame 708) by the gNB. TA 714 indicates a TA action in time by the UE A gNB DL-UL frame timing shift 716 indicates a offset in time between the slot 709 of frame 708 to slot 709a of frame 708.

In some embodiments, the UE capabilities of UL timing synchronization may be partly TA compensation, which may lead (e.g., cause, trigger, initiate, etc.) to gNB DL-UL frame timing shift, as shown in FIG. 7.

In some embodiments, the UE capabilities of UL timing synchronization may be a full (e.g., complete, maximum, satisfy, etc.) TA compensation, In some embodiments, the TA component may be obtained (e.g., acquired, determined, retrieved, etc.) by signaling, In some embodiments, the TA component may be obtained via the UE calculation itself.

In some embodiments (also referred to herein as, "case 1-a"), the UE may handle full TA and/or the UE may transmit a transparent payload or regenerative payload.

Since the UE can handle full TA, the UE may obtain one or more components (e.g., first component, second component, etc.) of the offset. In some embodiments, a first component may be the common offset portion. In some embodiments, a second component may be the UE-specific offset portion.

In some embodiments, the common offset portion may depend on the propagation delay between the satellite (e.g., satellite 506 in FIG. 5, satellite 606 in FIG. 6) and the reference point in beam footprint for regenerative payload.

In some embodiments, the common offset portion may depend on the propagation delay among the satellite and the reference point in beam footprint, as well as the gateway for transparent payload.

In some embodiments, the UE-specific offset portion may depend on the cell size. That is, the UE-specific offset portion may depend on the UE's location In some embodiments, the parameter common offset portion may be classified into one or more types of common offset portion (e.g., type-1 common offset portion, type-2 common offset portion).

In some embodiments, type-1 common offset portion may be statistic or variable based on the satellite categories.

In some embodiments, a type-1 common offset portion may be for GEO scenario using the unit of frame.

In some embodiments, a type-2 common offset portion may be for HAPS scenario using the unit of slot.

In some embodiments, from the UE side perspective, if the parameter common offset portion or UE-specific offset portion is obtained, the DL-UL timing relationship may be obtained based on the parameters.

In some embodiments, if the UE transmits the HARQ-ACK on PUCCH, then an offset may be added (e.g., the UE transmits the HARQ-ACK on PUCCH at start of slot n+k+offset).

In some embodiments, if the HARQ process mechanism follows the design in NR and/or if the maximum number of HARQ process is unchanged, then an offset may be added (e.g., sum, introduce, increase, supplement, etc.) on the top of k in NR.

In some embodiments, an offset may be calculated based on Equation (6).

$$\text{offset} = \text{offset\_1} + \text{offset\_2} = \frac{\text{common } TA + UE \text{ differential delay}}{\text{time interval of a slot or frame}} \quad (6)$$

In some embodiments, offset_1 may be common offset portion. In some embodiments, offset_2 may be UE-specific offset portion. In some embodiments, the value of common offset portion and/or UE-specific offset portion may be obtained via maximum RTT and/or maximum differential RTT, as shown in FIG. 5.

Figure 8:
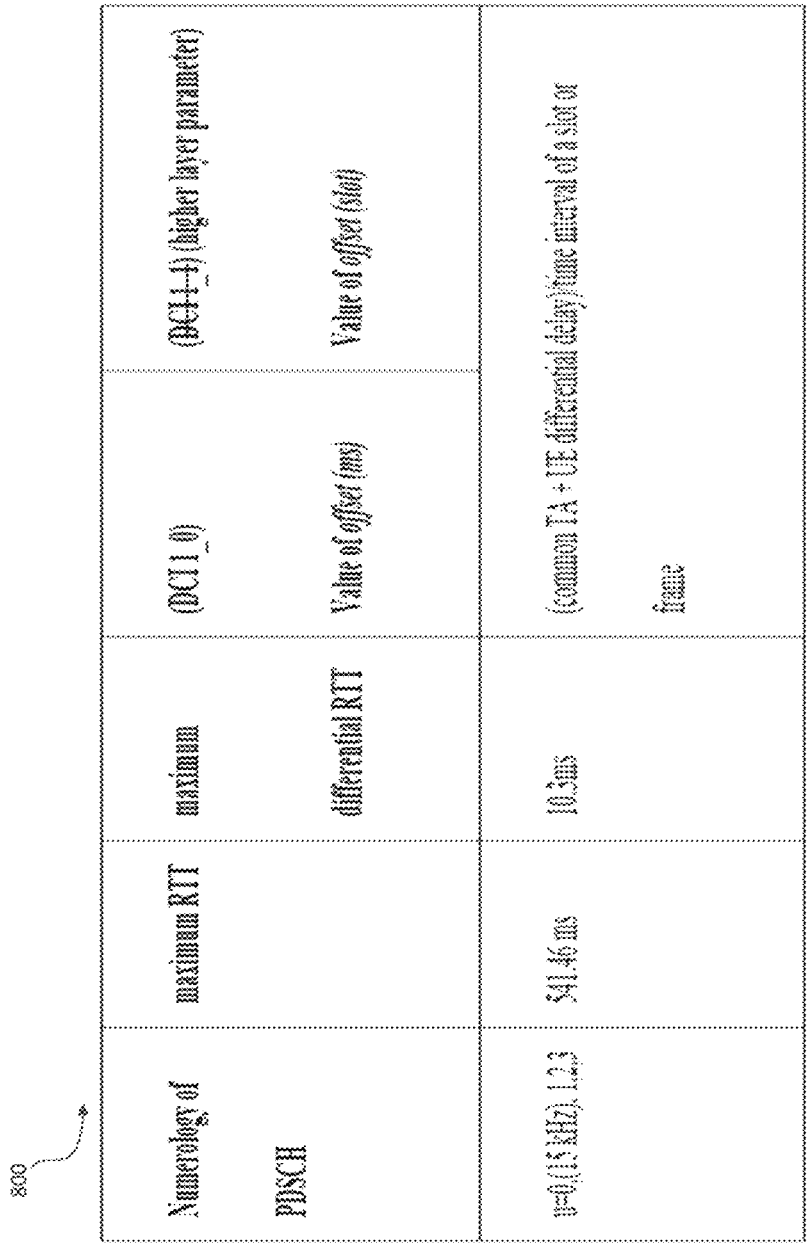
FIG. 8 illustrates a table of example definitions for parameters used for calculating an offset, in accordance with an embodiment of the present disclosure.

FIG. 8 illustrates a table of example definitions for parameters used for calculating an offset, in accordance with an embodiment of the present disclosure.

In some embodiments, if the HARQ process mechanism does not follow the design in NR and/or if the maximum number of HARQ process is changed, then the range k in NR may be extended. That is, in some embodiments, a delta (e.g., an offset) may be added on the top of k in NR, as shown in Equation (7).

$$k_{extended} = k + \text{delta} * 2^u \quad (7)$$

In some embodiments, u is the subcarrier spacing configurations.

In some embodiments, for scenario case 1-b, the UE 304 will handle partly TA, and UE 304 transmits transparent payload or regenerative payload.

In some embodiments (also referred to herein as, "case 1-b"), the UE may handle partly TA and/or the UE may transmit a transparent payload or regenerative payload.

Since the UE can only handle partly TA, the UE may obtain one component (e.g., first component, second component, etc.) of the offset. In some embodiments, a first component may be the common offset portion. In some embodiments, a second component may be the UE-specific offset portion.

In some embodiments, the parameter UE-specific offset portion may be obtained by signaling.

In some embodiments, the parameter UE-specific offset portion may be obtained via UE calculation itself, the calculation may be assisted with location information, DL information before transmission (e.g., broadcasting information, SIB information, RRC configuration message, etc.)

In some embodiments, the parameter UE-specific offset portion may be different per beam/per cell.

In some embodiments, form the UE side perspective, if the parameter UE-specific offset portion or common offset portion is obtained, then the DL-UL timing relationship may be obtained based on the parameters.

Figure 9:
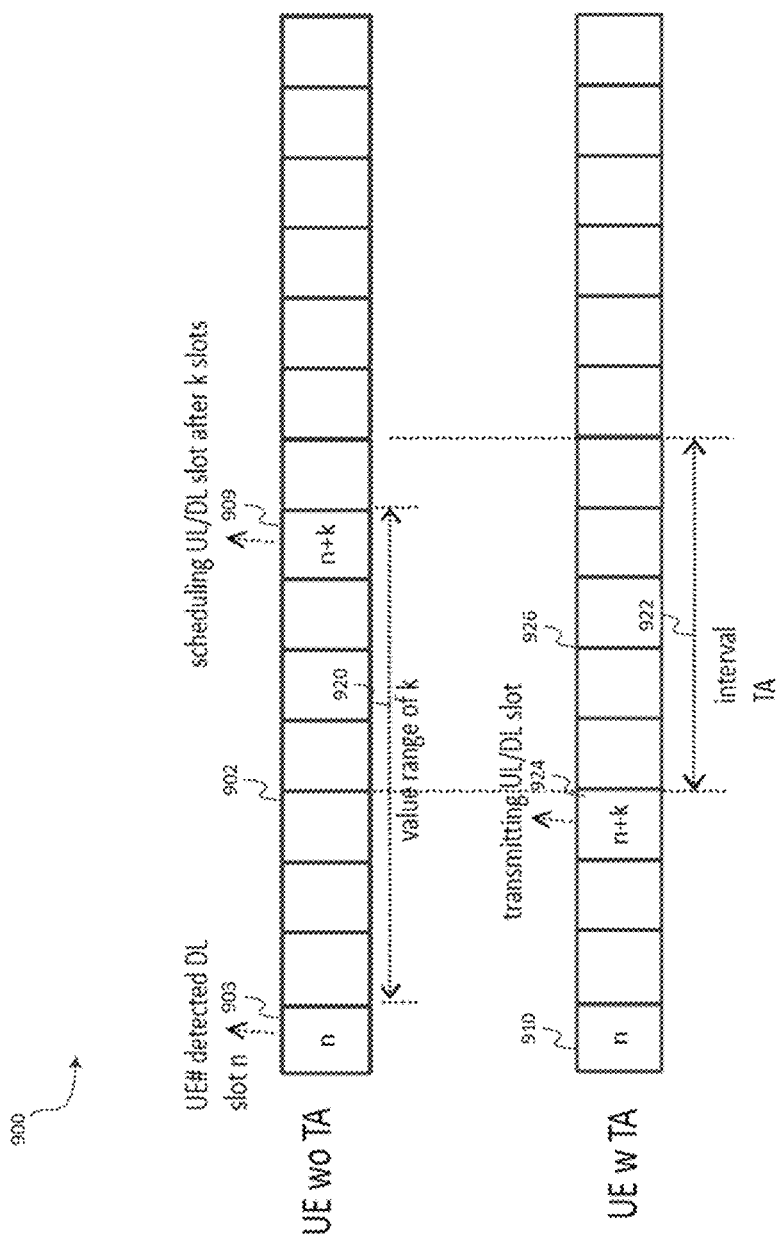
FIG. 9 is a block diagram depicting an example environment of a timing advance (TA) in NR, in accordance with an embodiment of the present disclosure.

FIG. 9 is a block diagram depicting an example environment 900 of a timing advance (TA), in accordance with an embodiment of the present disclosure. The environment 900 includes a frame 902 that may be transmitted from a UE 304 to a BS 302 or from a BS 302 to a UE 304, and containing a plurality of slots. Slot 903 (shown in FIG. 9 as, "slot n") occurs before slot 909 (shown in FIG. 9 as "n+k"). In some embodiments, slot 903 may correspond with a "UE # detected DL". In some embodiments, slot 909 (shown in FIG. 9 as, "n+k") may correspond with a "scheduling UL/DL slot after k slots". In some embodiments, slot 924 (shown in FIG. 9 as, "n+k") may correspond with a "transmitting UL/DL slot".

Offset 920 (shown in FIG. 9 as, "value range of k") indicates an offset in time between the slot 903 and the slot 909. Offset 922 (shown in FIG. 9 as, "interval TA") indicates a TA procession.

Figure 10:
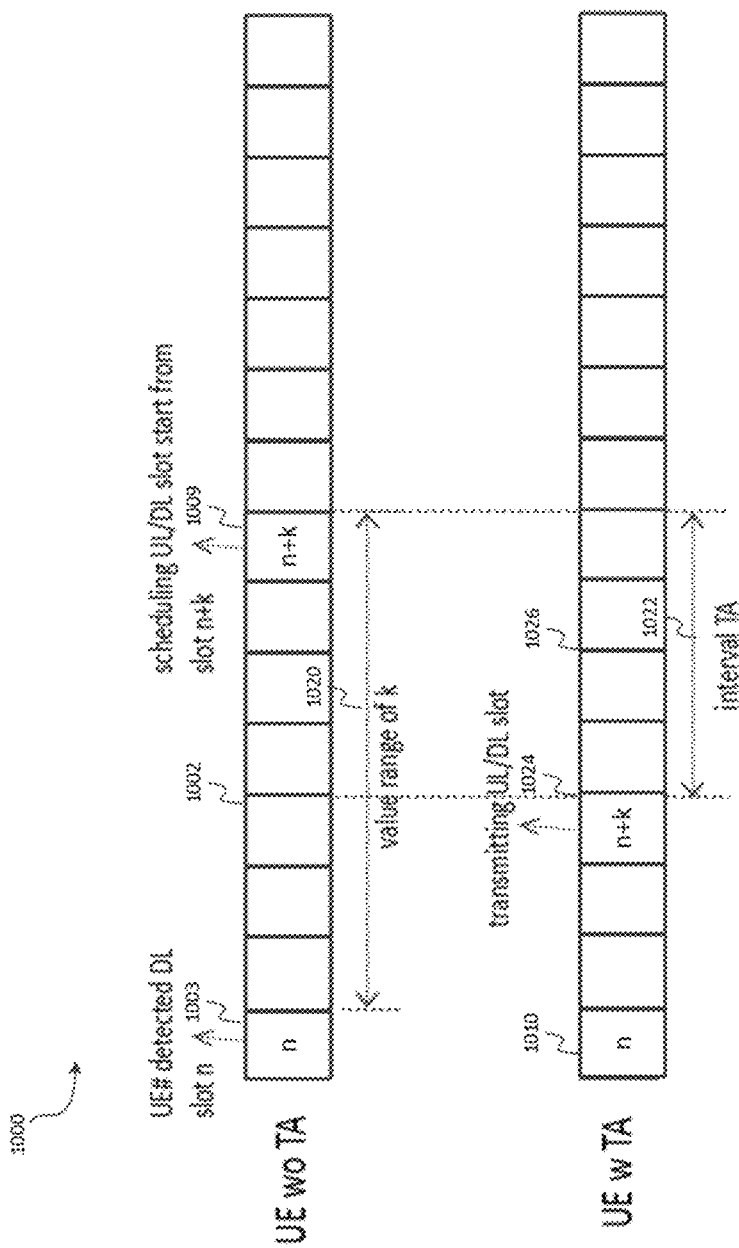
FIG. 10 is a block diagram depicting an example environment of a timing advance (TA) in NR, in accordance with an embodiment of the present disclosure.

FIG. 10 is a block diagram depicting an example environment 1000 of a timing advance (TA), in accordance with an embodiment of the present disclosure. The environment 1000 includes a frame 1002 that may be transmitted from a UE 304 to a BS 302 or from a BS 302 to a UE 304, and containing a plurality of slots. Slot 1003 (shown in FIG. 10 as, "slot n") occurs before slot 1009 (shown in FIG. 10 as "n+k"). In some embodiments, slot 1003 may correspond with a "UE # detected DL". In some embodiments, slot 1009 (shown in FIG. 10 as, "n+k") may correspond with a "scheduling UL/DL slot start from slot n+k". In some embodiments, slot 1010 (shown in FIG. 10 as, "n") may correspond with a "transmitting UL/DL slot".

Offset 1020 (shown in FIG. 10 as, "value range of k") indicates an offset in time between the slot 1003 and the slot 1009. Offset 1022 (shown in FIG. 10 as, "interval TA") indicates a TA procession.

In some embodiments, a BS 302 and/or a UE 304 may introduce (e.g., defined, generated, created, etc.) an offset $K_{offset}$ and/or apply the offset to modify the relevant timing relationships. In some embodiments, components of the offset $K_{offset}$ may indicate that a common part and/or UE specific part may be considered. In some embodiments, an extended offset $K_{offset}$ may be designed (e.g., defined, introduced, generated, created, etc.) to facilitate the timing advance operation in NTN.

In some embodiments, for the transmission timing of DCI scheduled PUSCH (including CSI on PUSCH), the slot allocated for the PUSCH can be modified (e.g., altered, updated, etc.) based on Equation 8.

$$\left\lfloor n \cdot \frac{2^{u_{PUSCH}}}{2^{u_{PDCCH}}} \right\rfloor + K_2 + K_{offset}; \quad (8)$$

where n is the slot with the scheduling DCI, $K_2$ is based on the numerology of PUSCH, $u_{PUSCH}$ and $u_{PDCCH}$ are the subcarrier spacing configurations for PUSCH and PDCCH, respectively; and the value of K2 is in the range of 0, . . . , 32. In some embodiments, components of the offset $K_{offset}$ may indicate that a common part and/or UE specific part may be considered.

In some embodiments, for the transmission timing of RAR grant scheduled PUSCH, the UE 304 transmits the PUSCH in a slot $n+K_2+\Delta+K_{offset}$; where a UE 304 receives a PDSCH with a RAR message ending in slot n for a corresponding PRACH transmission from the UE 304, the UE 304 transmits the PUSCH in slot $n+K_2+\Delta$, where $K_2$ and $\Delta$ are integer values provided in 3GPP TS 38.214. In some embodiments, components of the offset $K_{offset}$ may indicate that a common part and/or UE specific part may be considered.

In some embodiments, for the transmission timing of HARQ-ACK on PUCCH, the UE 302 provides corresponding HARQ-ACK information in a PUCCH transmission within slot $n+K_1+K_{offset}$; where for a PDSCH reception ending in slot n or a SPS PDSCH release through a PDCCH reception ending in slot n, the UE 304 provides corresponding HARQ-ACK information in a PUCCH transmission within slot n+K$_1$, where K$_1$ is a number of slots and is indicated by the PDSCH-to-HARQ-timing-indicator field in the DCI format or indicated by higher layer signaling. In some embodiments, components of the offset K$_{offset}$ may indicate that a common part and/or UE specific part may be considered.

In some embodiments, for the MAC CE action timing, the corresponding action and the UE 304 assumption on the downlink configuration indicated by the MAC-CE command may be applied starting from the first slot that is after a slot defined by Equation (9).

$$\text{slot } n+XN_{slot}^{subframe,u}+K_{offset} \qquad (9);$$

where the value of X may depend on NTN UE capability, X is an integer, the value range of X is {3, other numbers}. In some embodiments, components of the offset K$_{offset}$ may indicated that a common part and/or UE specific part may be considered.

In an embodiment, for the CSI reference resource timing, the CSI reference resource is given in the downlink slot n−n$_{CSI_{ref}}$−K$_{offset}$. In some embodiments, the CSI reference resource for a CSI report in uplink slot n is defined by a single downlink slot n−n$_{CSI_{ref}}$, where, the value of n$_{CSI_{ref}}$ is an integer depends on the type of CSI report and is defined in 3GPP TS 38.214. In some embodiments, components of the offset K$_{offset}$ may indicate that a common part and/or UE specific part may be considered.

In an embodiments, for the transmission timing of aperiodic SRS, the UE transmits aperiodic SRS in each of the triggered SRS resource set(s) in a slot defined by Equation (10).

$$\text{slot}\left\lfloor n \cdot 2^{\frac{u_{SRS}}{u_{PDCCH}}}\right\rfloor + k + K_{offset} \qquad (10)$$

where a UE 304 receives a DCI triggering aperiodic SRS in slot n, the UE 304 transmits aperiodic SRS in each of the triggered SRS resource set(s) in slot $$\left\lfloor n \cdot 2^{\frac{u_{SRS}}{u_{PDCCH}}}\right\rfloor + k,$$

where k is configured via higher layer parameter slotOffset for each triggered SRS resources set and is based on the subcarrier spacing of the triggered SRS transmission, u$_{SRS}$ and u$_{PDCCH}$ are the subcarrier spacing configurations for triggered SRS and PDCCH carrying the triggering command respectively. In some embodiments, components of the offset K$_{offset}$ may indicate that a common part and/or UE specific part may be considered.

In some embodiments, an extended offset K$_{offset}$ may include components such as common part and/or UE specific differential part. In some embodiments, a different NTN case may be handled. In some embodiments, the common part may depend on the propagation delay between the satellite and/or the reference point in beam foot print for regenerative payload. In some embodiments, the UE specific part may depend on the cell size, in that it depends on the UE 's location in the beam foot print.

In some embodiments, for high altitude platform station with characters of low altitude and/or large beam width, K$_{offset}$ only include UE specific part.

In some embodiments, for high altitude but limited beam width case, or in some UE group specific operation case, K$_{offset}$ only includes a common part.

FIG. 11 illustrates a table 1100 of example definitions for components of extended offset for different use cases, in accordance with an embodiment of the present disclosure. In some embodiments, the BS/UE identify an offset between a first time-domain tag at which the first wireless communication device detects a signal transmitted from a wireless communication node and a second time-domain tag at which the first wireless communication device applies the signal, wherein the offset includes at least one of a common offset portion or a user equipment (UE)-specific offset portion.

In some embodiments, the signal can be: scheduling signaling (e.g., DCI), MAC activation/deactivation signaling, or an RRC configuration signaling. In some embodiments, the first wireless communication device applies the signal by one of following operations: the first wireless communication device may transmit the data (e.g. PUSCH/PUCCH, SRS) according to the scheduling, the first wireless communication device may apply the configuration from wireless communication node, or the first wireless communication device may transmit the feedback (e.g., the feedback can be ACK/NACK of HARQ for received PDSCH, RLC-ARQ feedback, CSI feedback for CSI measurement) of receiving signaling.

In some embodiments, the first wireless communication device and a second wireless communication device identify the same common offset portion, in response to satisfying at least one of the following conditions: the first wireless communication device and the second wireless communication device sharing the same time-frequency resource; the first wireless communication device and the second wireless communication device sharing the same demodulation reference signal (DMRS) resource group (e.g., the DM-RS resource group refers to the CDM group); the first wireless communication device and the second wireless communication device sharing the same QuasiCo-Location relationship; or the first wireless communication device and the second wireless communication device sharing the same UE group.

With regard to the UE group, the UE group can be organized according to the location, UE capability for polarization, or UE type. In some embodiments, the indicated common offset portion can be associated with corresponding group ID or in order of group ID.

With regard to the same QCL relationship, it means that the scheduled (for transmission or reception) channel (e.g., PDCCH, PDSCH, PUCCH, PUSCH) or RS (e.g., CSI-RS, SSB, PRS, DMRS, SRS) have same QCL/spatial relationship: it can refers the followings: (1) share same QCL indication ID (e.g., TCI (Transmission Configuration Indicator) state ID); (2) share same reference RS with regards to the corresponding QCL type; (3) share same reference resource for spatial relationship; (4) the reference resource for spatial relationship association share same source.

In some embodiments, the extended offset acquisition method is based on network indication.

In some embodiments, the extended offset acquisition methods include implicitly acquisition. In some embodiments, one or both parameters of components of extended offset may be indicated by SIB, RRC message, MAC CE, and/or a common DCI signaling. In some embodiments, the necessity of signaling one or two parameters is related with the UE compensation capability.

In some embodiments, a new parameter is configured explicitly for the indication of common component of extended offset. In some embodiments, the new parameter may be flexible for scheduling. In some embodiments, where additional signaling overhead may be needed, timing drift may be taken into consideration when the signaling was detected and/or applied.

In some embodiments, explicit signaling is defined for UE specific part of extended offset, the general mechanism of TA indication in RAR in NR could be followed. In some embodiments, in order to satisfy the larger coverage per beam/cell of NTN, extension of value range for TA indication in RAR of NR may be determined.

In some embodiments, the extended offset acquisition methods may include implicitly acquisition.

In some embodiments, implicitly acquisition methods can be based on UE self-calculated with assistance of a timing advanced value, that includes, a timing advanced value indicated by wireless communication node; a timing advanced value calculated by the first wireless communication device; and/or a timing advanced value reported by the first wireless communication device. In some embodiments, the reported timing advance value can be components of extended offset, the reported timing advance value can be the applied TA adjustment value in previous transmission of msg-3, msg-A, or PUSCH. In some embodiments, the UE self calculation can based on TA indication from BS, self-calculated value by UE, or previous reported value by UE.

In some embodiments, the UE 304 may obtain the common part and/or UE specific part of extended offset, assuming UE knows the UE location and/or associated satellite location (e.g., satellite ephemeris).

In some embodiments, the UE 304 obtains the common part of the offset via indicated common TA. In some embodiments, a way to convert the common TA to common part of the offset could be based on Equation (11) and/or Equation (12).

$$\text{Common offset=ceil (common } TA/\text{time interval of a slot)} \quad (11)$$

$$\text{Common offset=ceil (common } TA/\text{time interval of a frame)} \quad (12)$$

In some embodiments, a fixed time interval could be time-length of a slot, time-length of a frame, time-length of a symbol, or N*Ts, where N is an integer.

In some embodiments, granularity (Ts) may be defined by Equation (13) and Equation (14).

$$T_s=1/(\Delta f_{ref} \cdot N_{f,ref}), \Delta f_{ref}=15 \cdot 10^3 \text{ Hz} \quad (13)$$

$$N_{f,ref}=2048 \quad (14)$$

In some embodiments, a way to convert the common TA to common part of the extended offset could be based on Equation (15), Equation (16), and/or Equation (17). In some embodiments, the units of the common TA and the common offset may be different.

$$\text{Common offset=ceil (common } TA/\text{a fixed time interval)} \quad (15)$$

$$\text{Common offset=floor (common } TA/\text{a fixed time interval)} \quad (16)$$

$$\text{Common offset=round (common } TA/\text{a fixed time interval)} \quad (17)$$

In some embodiments, ceil ( ) may be a mathematical function that always rounds a number up to the next largest whole number or integer. In some embodiments, floor ( ) may be a mathematical function that returns the largest integer less than or equal to a given number. In some embodiments, round ( ) may be a mathematical function that returns the value of a number rounded to the nearest integer.

FIG. 12 illustrates a table 1200 of example definitions for extended offset acquisition methods for different use cases, in accordance with an embodiment of the present disclosure.

In some embodiments, for variable cases depicted in table 1100 on the extended offset for timing relationships, there could be various components acquisition methods as defined by table 1200.

Figure 13:
FIG. 13 illustrates a table 1300 of example definitions for extended offset acquisition methods for different use cases, in accordance with an embodiment of the present disclosure.

FIG. 13 illustrates a table 1300 of example definitions for extended offset acquisition methods for different use cases, in accordance with an embodiment of the present disclosure.

Figure 14:
FIG. 14 illustrates a table of example definitions for extended offset acquisition methods for different use cases, in accordance with an embodiment of the present disclosure.

FIG. 14 illustrates a table of example definitions for extended offset acquisition methods for different use cases, in accordance with an embodiment of the present disclosure.

In some embodiments, for variable cases depicted in table 1100 on the extended offset for timing relationships, there could be various components acquisition methods as defined by table 1300.

In some embodiments, in order to match with the larger offset in NTN, the unit of extended offset may be enlarged. In some embodiments, utilizing frames or large granularity as the unit of timing offset for NTN, may highly decrease the number of slots.

In some embodiments, with the enlargement of the unit for timing offset, the corresponding indicator bits field may be significantly reduced. For example, the offset can be up to 1092 slots in GEO NTN if NTN system follows the granularity of timing offset in NR. However, the number of slots can be composed by 54 frames and 12 slots, which may only need 6 bits in frames instead of 11 bits in slots.

In some embodiments, as for the common offset, whether frames or slots should be used is determined by the type of satellite. For example, the unit of common offset should be in slots when the UE in LEO or HAPS NTN. Otherwise, in GEO or MEO NTN, the common offset should be at least in frames.

In some embodiments, for UE specific offset, the value would be range from several slots to tens of slots in different satellites, so UE specific offset may be in slots or in frames. In some embodiments, the unit of UE specific offset is slots.

In some embodiments, the granularity or unit of timing offset may be enlarged by frames, where the common offset is at least in frames and UE specific offset is at least in slots.

In some embodiments, the unit of timing offset is indicated by network.

In some embodiments, a method for the indicator of unit may include using 1 bit to indicate the unit, for example, 0 indicates slots, 1 indicates frames. In some embodiments, a method for the indicator of unit may include using the highest bit to indicate the unit and/or the residual bits to indicate the values, for example, if the highest bit is 0, it denotes the unit is frame, otherwise, the unit is slot.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein.

Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
receiving, by a first wireless communication device, a system information block (SIB indicating at least one of a common offset portion or a user equipment (UE)-specific offset portion; and
identifying, by the first wireless communication device, an offset between a first time-domain tag at which the first wireless communication device detects a signal transmitted from a wireless communication node and a second time-domain tag at which the first wireless communication device applies the signal,
wherein the offset includes at least one of the common offset portion or the UE-specific offset portion, wherein at least one of:
the offset is added to a component (k) of the second time-domain tag; or
the offset is a function of 2 to the power of u, where u is a subcarrier spacing configuration.

2. The wireless communication method of claim 1, wherein the first wireless communication device applies the signal comprises:

transmitting, by the first wireless communication device, data according to a scheduling; or applying, by the first wireless communication device, a configuration from the wireless communication node; or transmitting, by the first wireless communication device, feedback of receiving signaling.

3. The wireless communication method of claim 1, wherein the first wireless communication device and a second wireless communication device identify the same common offset portion, in response to satisfying at least one of following conditions:

the first wireless communication device and the second wireless communication device sharing a same time-frequency resource;

the first wireless communication device and the second wireless communication device sharing a same demodulation reference signal (DMRS) resource group;

the first wireless communication device and the second wireless communication device sharing a same QuasiCo-Location relationship; or the first wireless communication device and the second wireless communication device sharing a same UE group.

4. The wireless communication method of claim 1, further comprising:

obtaining, by the first wireless communication device, at least one of the common offset portion or the UE specific offset portion based on at least one of:

a timing advance value being indicated by the wireless communication node;

a timing advance value being calculated by the first wireless communication device; or a timing advance value being reported by the first wireless communication device.

5. The wireless communication method of claim 4, wherein the timing advance value is indicated by the wireless communication node by at least one of:

broadcasting information received by the first wireless communication device;

SIB information received by the first wireless communication device in the SIB; or a Radio Resource Control (RRC) configuration message received by the first wireless communication device.

6. The wireless communication method of claim 4, wherein the timing advance value is calculated by the first wireless communication device based on at least one of:

a location of the first wireless communication device; or a location of a satellite associated with the wireless communication node.

7. The wireless communication method of claim 6, wherein the location of the first wireless communication device corresponds to a reference point in an area associated with the wireless communication node.

8. The wireless communication method of claim 7, wherein the reference point is configured by the wireless communication node.

9. The wireless communication method of claim 1, wherein a unit of the common offset portion is either a slot or a frame, and wherein a unit of the UE specific offset portion is either a slot or a frame.

10. The wireless communication method of claim 9, further comprising:

receiving, by the first wireless communication device via signaling, at least one of the unit of the common offset portion or the unit of the UE specific offset portion.

11. The wireless communication method of claim 9, wherein at least one of the unit of the common offset portion or the unit of the UE-specific offset portion is predefined.

12. The wireless communication method of claim 11, wherein the unit of the common offset portion is predefined to be the frame.

13. The wireless communication method of claim 11, wherein the unit of the UE-specific offset portion is predefined to be the slot.

14. The wireless communication method of claim 1, wherein the signal includes at least one of a downlink control information (DCI) signal, a random access response (RAR) signal, or a medium access control (MAC) control element (CE).

15. The wireless communication method of claim 1, wherein the first wireless communication device applies the signal comprises:

transmitting, by the first wireless communication device, a physical uplink shared channel (PUSCH); or transmitting, by the first wireless communication device, a hybrid automatic repeat request-acknowledgement (HARQ-ACK) on a physical uplink control channel (PUCCH); or transmitting, by the first wireless communication device, a channel state information (CSI) report; or applying, by the first wireless communication device, a configuration by a medium access control (MAC) control element (CE); or transmitting, by the first wireless communication device, a sounding reference signal (SRS).

16. A first wireless communication device, comprising:

at least one processor configured to:

receive a system information block (SIB) indicating at least one of a common offset portion or a user equipment (UE)-specific offset portion; and identify an offset between a first time-domain tag at which the first wireless communication device detects a signal transmitted from a wireless communication node and a second time-domain tag at which the first wireless communication device applies the signal, wherein the offset includes at least one of the common offset portion or the UE-specific offset portion, wherein at least one of:

the offset is added to a component (k) of the second time-domain tag; or the offset is a function of 2 to the power of u, where u is a subcarrier spacing configuration.

17. The first wireless communication device of claim 16, wherein at least one processor is configured to:

transmit, via a transmitter, data according to a scheduling; or apply a configuration from the wireless communication node; or transmit, via the transmitter, feedback of receiving signaling.

* * * * *